United States Patent [19]

Sorensen et al.

[11] Patent Number: 5,593,630
[45] Date of Patent: Jan. 14, 1997

[54] METHOD OF INJECTION MOLDING OF CABLE TIES WITH A MOLD HAVING AN ENHANCED CORE SECTION

[75] Inventors: Soren C. Sorensen, San Diego; Jens O. Sorensen, Rancho Santa Fe, both of Calif.

[73] Assignee: GB Electrical, Inc., Milwaukee, Wis.

[21] Appl. No.: 428,337

[22] Filed: Apr. 25, 1995

Related U.S. Application Data

[62] Division of Ser. No. 71,474, Jun. 4, 1993, Pat. No. 5,440,786.

[51] Int. Cl.⁶ .......................... B29C 45/44; B29C 33/42
[52] U.S. Cl. .......................... 264/219; 249/63; 264/318; 264/328.1; 425/577
[58] Field of Search ...................... 264/328.1, 219, 264/318; 425/577, 468; 249/63

[56] References Cited

U.S. PATENT DOCUMENTS

| | | | |
|---|---|---|---|
| 3,416,198 | 12/1968 | Geisinger | 24/150 |
| 3,766,608 | 10/1973 | Fay | 24/16 |
| 3,924,299 | 12/1975 | McCormick | 24/16 |
| 4,093,288 | 6/1978 | Subuki | 24/16 PB |
| 4,137,606 | 2/1979 | Wood | 24/16 |
| 4,688,302 | 8/1987 | Caveney et al. | 24/16 |
| 4,766,651 | 8/1988 | Kobayashi et al. | 24/16 |
| 5,124,108 | 6/1992 | Bennett et al. | 425/577 |
| 5,146,654 | 9/1992 | Caveney et al. | 24/16 PB |
| 5,267,373 | 12/1993 | Chisek | 24/30.5 P |
| 5,275,548 | 1/1994 | Tibiletti | 425/577 |

FOREIGN PATENT DOCUMENTS

| | | | |
|---|---|---|---|
| 2528724 | 2/1976 | Germany | 24/16 PB |
| 1035143 | 7/1966 | United Kingdom . | |
| 8300676 | 3/1983 | WIPO | 24/16 PB |

*Primary Examiner*—Jill L. Heitbrink
*Attorney, Agent, or Firm*—Edward W. Callan

[57] ABSTRACT

A cable tie that includes an elongated tongue with two ends and two broad sides, a locking head at one end of the tongue, a tip at the other end of the tongue, and a set of ratchet teeth extending along one broad side of the tongue, wherein the locking head has sides defining an opening for receiving the tip of the tongue, the sides including a movable pawl that is hinged at one side of the opening and an abutment surface that is at least in part directly opposite across the opening from the pawl, and wherein the pawl has at least one pawl tooth disposed for engaging the set of ratchet teeth when the tip of the tongue has been inserted through the opening with the set of ratchet teeth facing the pawl, is injection molded by a method including the steps of (a) providing a mold that includes mold parts defining a cavity in the general shape of the tie, wherein one of the mold parts includes a core section defining a surface of the pawl that includes the at least one pawl tooth and at least a part of the abutment surface that is directly opposite the at least one pawl tooth; (b) injecting molten plastic material into the mold cavity; (c) solidifying the plastic material in the mold cavity to form the tie; and (d) ejecting the solidified tie from the mold; wherein step (a) includes providing a said mold in which the core section further defines a notch in the part of the abutment surface that is directly opposite the at least one pawl tooth.

2 Claims, 2 Drawing Sheets

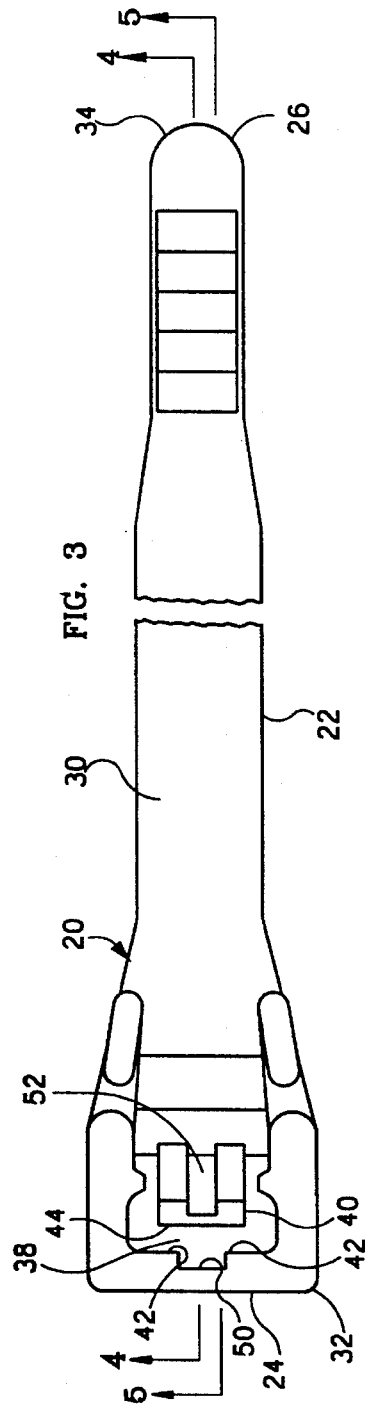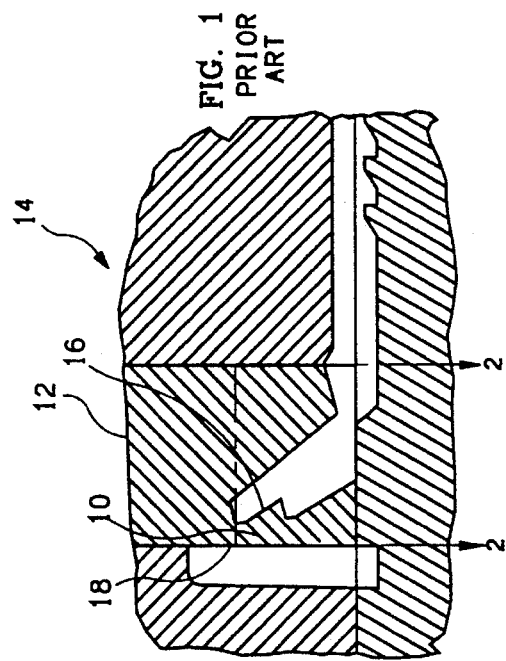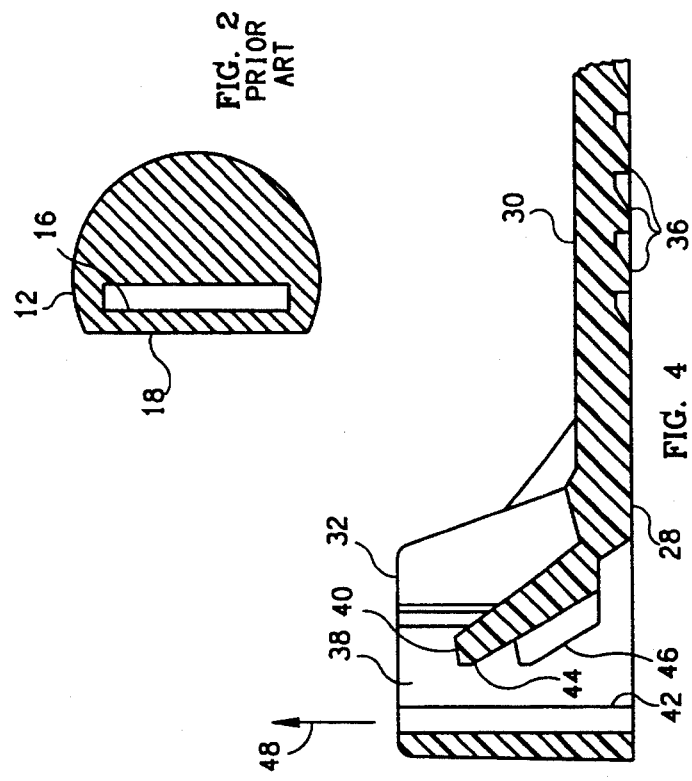

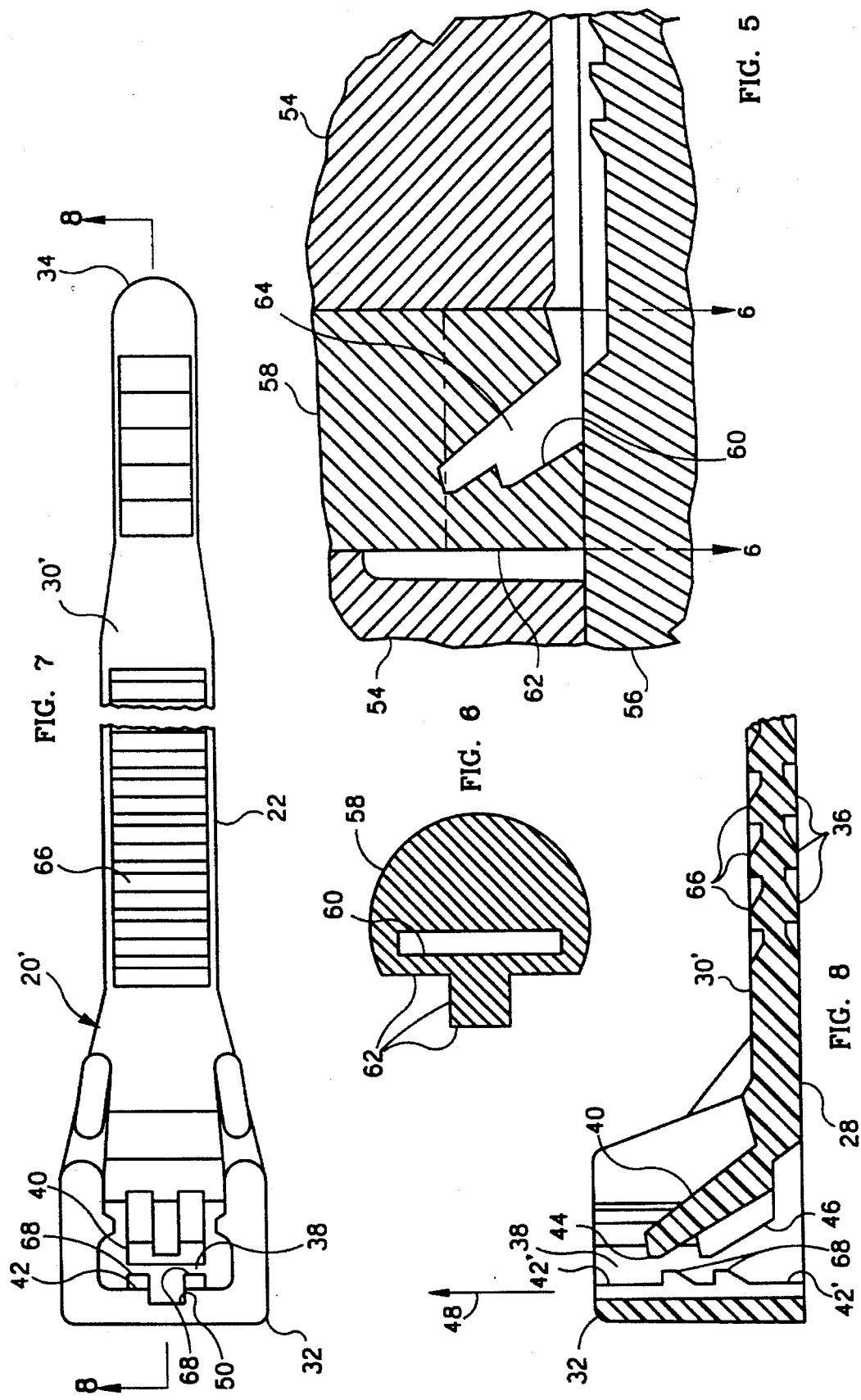

5,593,630

METHOD OF INJECTION MOLDING OF CABLE TIES WITH A MOLD HAVING AN ENHANCED CORE SECTION

This application is a division of Ser. No. 08/071,474 filed Jun. 4, 1993, now U.S. Pat. No. 5,440,786.

BACKGROUND OF THE INVENTION

The present invention pertains to injection molding of a tie that is useful for forming a loop for retaining a bundle of elongated articles, such as cables. Such a tie is commonly known as a cable tie.

One type of tie includes an elongated tongue with two ends and two broad sides, a locking head at one end of the tongue, a tip at the other end of the tongue, a first set of ratchet teeth extending along one broad side of the tongue, and a second set of ratchet teeth on the other broad side of the tongue, wherein the locking head has sides defining an opening for receiving the tip of the tongue, the sides including a movable pawl that is hinged at one side of said opening and an abutment surface that is at least in part directly opposite across the opening from the pawl, with at least one tooth being disposed on the abutment surface for engaging the second set of ratchet teeth when the tip of the tongue has been inserted through the opening with the second set of ratchet teeth facing the abutment surface, and wherein the pawl has at least one pawl tooth disposed for engaging the first set of ratchet teeth when the tip of the tongue has been inserted through said opening with the set of ratchet teeth facing the pawl. This type of tie may be injection molded by a method comprising the steps of (a) providing a mold that includes mold parts including a cavity in the general shape of the tie, wherein one of the mold parts includes a core section that forms the surface of the pawl that includes the at least one pawl tooth and that forms at least a part of the abutment surface that is directly opposite the at least one pawl tooth; (b) injecting molten plastic material into the mold cavity; (c) solidifying the plastic material in the mold cavity to form the tie; and (d) ejecting the solidified tie from a mold. In a prior art mold used for injection molding small ties, the core section is so thin in the region that lies directly between the tip of the at least one pawl tooth and the directly opposite part of the abutment surface that the core section cracks in such region after repetitively injecting the molten plastic material into the mold cavity under high injection pressure, whereby at least the core section must frequently be replaced. FIGS. 1 and 2 show this thin region 10 of the core section 12 of such a prior art mold part 14, with the thin region 10 being bounded on opposite sides by a first surface 16 defining the surface of the pawl that includes the at least one pawl tooth and a second surface 18 defining at least the part of the abutment surface that is directly opposite the at least one pawl tooth.

SUMMARY OF THE INVENTION

The present invention reduces the frequency with which core sections are cracked when repetitively injecting molten plastic into the mold cavity under high injection pressure by providing a method of injection molding a tie, as described above, wherein step (a) comprises providing said mold in which the core section further forms a notch within the at least one tooth in the part of the abutment surface that is directly opposite the at least one pawl tooth. By further defining such a notch the core section is wider and thus less susceptible to cracking in the region between the surfaces of the core section that define the at least one pawl tooth and the directly opposite part of the abutment surface.

Additional features of the present invention are described with reference to the detailed description of the preferred embodiments.

BRIEF DESCRIPTION OF THE DRAWING

FIG. 1 is a sectional partial elevation view of a portion of a mold that includes a prior art core section.

FIG. 2 is a sectional view of the prior art core section as taken along lines 2—2 in FIG. 1.

FIG. 3 is a fragmentary top plan view of a preferred embodiment of a tie injection molded according to the method of the present invention.

FIG. 4 is a partial sectional view of the tie of FIG. 3 as taken along lines 4—4 in FIG. 3.

FIG. 5 is a sectional partial elevation view of a portion of a mold that includes a core section according to the method of the present invention for forming the corresponding portion of the tie of FIG. 3, as if taken along lines 5—5 in FIG. 3.

FIG. 6 is a sectional view of the core section according to the method of the present invention as taken along fines 6—6 in FIG. 5.

FIG. 7 is a fragmentary top plan view of an alternative preferred embodiment of a tie injection molded according to the method of the present invention.

FIG. 8 is a partial sectional view of the tie of FIG. 7 as taken along lines 8—8 in FIG. 7.

DETAILED DESCRIPTION

Referring to FIGS. 3 and 4, a preferred embodiment of a tie injection molded 20 according to the method of the present invention includes an elongated tongue 22 with two ends 24, 26 and two broad sides 28, 30, a locking head 32 at one end 24 of the tongue 22, a tip 34 at the other end 26 of the tongue 22, and a set of ratchet teeth 36 extending along one broad side 28 of the tongue 22. The locking head 32 has sides defining an opening 38 for receiving the tip 34 of the tongue 22, the sides including a movable pawl 40 that is hinged at one side of opening 38 and an abutment surface 42 that is at least in part directly opposite across the opening 38 from the pawl 40. The pawl 40 has a first pawl tooth 44 and a second pawl tooth 46 disposed for engaging the set of ratchet teeth 36 when the tip 34 of the tongue 22 has been inserted through the opening 38 in the direction indicted by the arrow 48 with the set of ratchet teeth 36 facing the pawl 40. The part of the abutment surface 42 that is directly opposite the first pawl tooth 44 and the second pawl tooth 46 includes a notch 50. The notch 50 is elongated in the direction 48 in which the tip 34 of the tie 20 is inserted through the opening 38 in the locking head 32.

In other embodiments, the pawl 40 may include only one pawl tooth or more than two pawl teeth; and the positions of the pawl 40 and the abutment surface 42 may be interchanged to be on opposite sides of the opening 38 from the respective positions shown in the Drawing so that the abutment surface 42 is on the side of the locking head 32 adjacent the tongue 22.

In the embodiment of FIGS. 3 and 4, the side of the pawl 40 that does not face the abutment surface 42 includes a hollow section 52; and the second pawl tooth 46 includes a hollow section (not visible) parallel to but not necessarily as wide as the hollow section 52. These hollow sections are designed to prevent deformation of the first and second pawl teeth 44, 46 during injection molding, as more fully described in applicant's copending U.S. patent application Ser. No. 07/836,496. Such hollow sections are not required in all embodiments.

Referring to FIGS. 5 and 6, the pertinent portions of the a preferred embodiment of a mold according to the present invention for injection molding the tie of FIGS. 3 and 4 includes a first mold part 54 and a second mold part 56. The first mold part 54 includes a core section 58 having a first surface 60 defining the surface of the pawl 40 that includes the two pawl teeth 44, 46 and a second surface 62 defining at least a part of the abutment surface 42 that is directly opposite the pawl teeth 44, 46. The second surface 62 of the core section 58 defines the notch 50 in the abutment wall 42. The contour of the notch 50 may be any of a variety of different shapes that enhances the strength of the core section 58. The core section 58 preferably is constructed separately from the remainder of the first mold part 54 and inserted into the first mold part 54. The core section 58 itself may be constructed from a plurality of separate elements.

The tie 20 is injection molded by a method including the steps of (a) providing a mold that includes the first and second mold pans 54, 56, as described above, defining a cavity 64 in the general shape of the tie 20, as described above;

(b) injecting molten plastic material into the mold cavity 64;

(c) solidifying the plastic material in the mold cavity 64 to form the tie 20; and (d) ejecting the solidified tie 20 from the mold.

The method of the present invention can be used to simultaneously injection mold a plurality of ties 20 with a mold defining a plurality of mold cavities 64 for forming the plurality of ties 20.

Referring to FIGS. 7 and 8, an alternative preferred embodiment of a tie 20' of the present invention further includes a second set of ratchet teeth 66 on the other broad side 30' of the tongue 22 and a pair of teeth 68 disposed on the abutment wall 42' for engaging the second set of ratchet teeth 66 when the tip 34 of the tongue 22 has been inserted through the opening 38 in the direction indicated by the arrow 48 with the second set of ratchet teeth 66 facing the abutment wall 42'. In other respects the tie 20' of this alternative preferred embodiment is identical to and is injection molded with the same type of mold and by the same method as the tie 20 described above with reference to FIGS. 3 and 4. The cable tie 20' described with reference to FIGS. 7 and 8 and a method of injection molding such a cable tie are the subject of applicants' copending U.S. patent application Ser. No. 08/010,538.

The present invention enhances the strength of the core section 58 in the alternative preferred embodiment of FIGS. 7 and 8 more than in the embodiment described above with reference to FIGS. 3, 4, 5 and 6, since the distance between the points of the respective pawl teeth 44, 46 and the points of the directly opposite respective teeth 68 on the abutment wall 42' is less than the distance between the points of the pawl teeth 44, 46 and the directly opposite respective pans of the abutment wall 42 in the preferred embodiment described above with reference to FIGS. 3, 4, 5 and 6.

The core section may define more than one notch in the abutment surface that is directly opposite the at least one pawl tooth.

We claim:

1. A method of injection molding a tie that includes an elongated tongue with two ends and two broad sides, a locking head at one end of the tongue, a tip at the other end of the tongue, a first set of ratchet teeth extending along one broad side of the tongue, and a second set of ratchet teeth on the other broad side of the tongue, wherein the locking head has sides defining an opening for receiving the tip of the tongue, the sides including a movable pawl that is hinged at one side of said opening and an abutment surface that is at least in pan directly opposite across the opening from the pawl, with at least one tooth being disposed on the abutment surface for engaging the second set of ratchet teeth when the tip of the tongue has been inserted through the opening with the second set of ratchet teeth facing eh abutment surface, and wherein the pawl has at least one pawl tooth disposed for engaging the first set of ratchet teeth when the tip of the tongue has been inserted through said opening with the first set of ratchet teeth facing the pawl, the method comprising the steps of (a) providing a mold that includes mold parts including a cavity in the general shape of the tie, wherein one of the mold parts includes a core section that forms the surface of the pawl that includes the at least one pawl tooth and that forms at least the part of the abutment surface that is directly opposite the at least one pawl tooth;

(b) injecting molten plastic material into the mold cavity;

(c) solidifying the plastic material in the mold cavity to form the tie; and (d) ejecting the solidified tie from the mold;

wherein step (a) comprises providing said mold in which the core section further forms a notch within the at least one tooth in the part of the abutment surface that is directly opposite the at least one pawl tooth.

2. A method according to claim 1, wherein said notch is elongated in a direction in which the tip of the tie is inserted through said opening in the locking head.

\* \* \* \* \*